Aug. 31, 1954
J. W. WHALEN
2,687,748
ORIFICE PLATE ASSEMBLY
Filed July 30, 1951
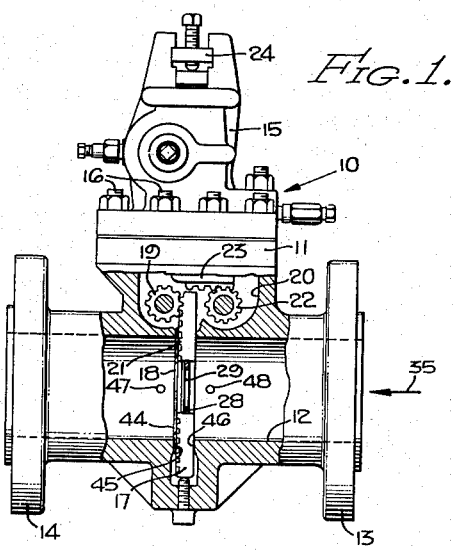
FIG. 1.
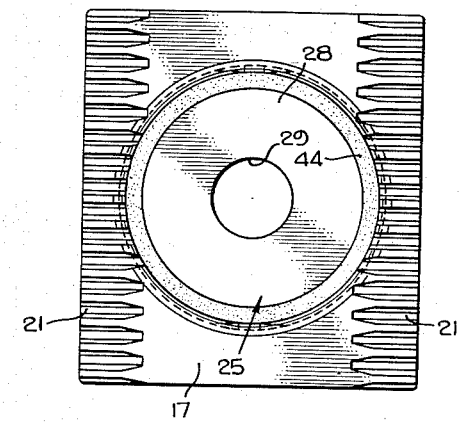
FIG. 2.
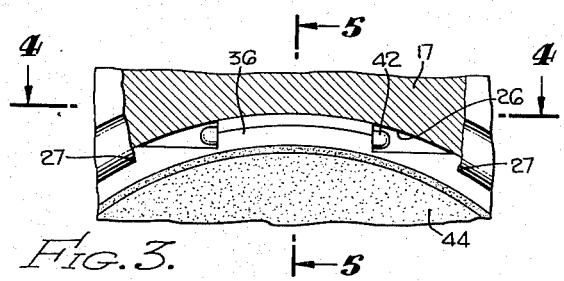
FIG. 3.
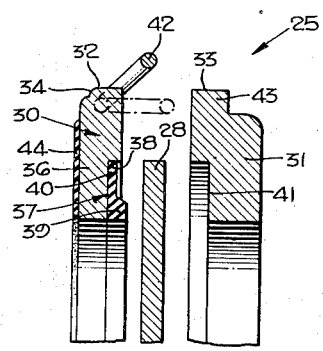
FIG. 6.
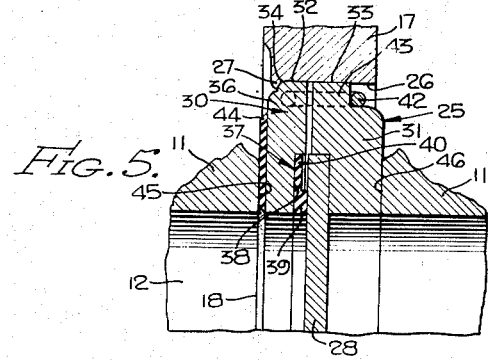
FIG. 4.
FIG. 5.
JOHN W. WHALEN,
INVENTOR.
BY Lyon & Lyon
ATTORNEYS Patented Aug. 31, 1954

2,687,748

UNITED STATES PATENT OFFICE 2,687,748

ORIFICE PLATE ASSEMBLY

John W. Whalen, Inglewood, Calif., assignor to Daniel Orifice Fitting Company, Los Angeles, Calif., a corporation of California Application July 30, 1951, Serial No. 239,368

4 Claims. (Cl. 138—44)

This invention relates to orifice fitting devices of the general type shown in the Daniel Patents Nos. 1,965,826, 1,996,192 and 2,407,951.

It is the object of the present invention to provide an improved form of orifice plate assembly which may be mounted as a unit on the plate carrier of the types shown in said Daniel patents.

A more particular object is to provide an orifice plate assembly for mounting on a plate carrier, the assembly including an orifice plate clamped between a sealing ring and a compression ring, the sealing ring having a relatively hard rubber surface for sealing against the body of the orifice plate fitting device and having a relatively soft rubber seal for engagement with the orifice plate.

Another object is to provide an improved orifice plate assembly in which the over-all width is greater than the width of the slot in the valve body so that the assembly is reduced in thickness to compress one or both of the sealing rings when it is moved into operative sealing position in said slot.

Another object is to provide such a device in which the sealing rings are both vulcanized to a single annular metallic ring.

Another object is to provide a device of this type which is simple in design and which is characterized by long trouble-free service.

Other and more detailed objects and advantages will appear more fully hereinafter.

In the drawings:

Figure 1 is a side elevation partly in section showing an orifice plate fitting device of the type to which my present invention appertains.

Figure 2 is a front elevation of a plate carrier and showing an orifice plate assembly therein of the type embodying my invention.

Figure 3 is a fragmental sectional view showing the mounting of the orifice plate assembly with respect to the plate carrier.

Figure 4 is a plan view partly broken away taken in the direction 4—4 as shown in Figure 3, the plate carrier being omitted.

Figure 5 is a transverse sectional view partly broken away taken substantially on the line 5—5 as shown in Figure 3.

Figure 6 is an exploded view showing the manner of assembly of the orifice plate between the sealing ring and compression ring.

Referring to the drawings, the orifice plate fitting device generally designated 10 includes a body 11 having a flow passageway 12 and a pair of spaced flanges 13 and 14 for connection to upstream and downstream pipes (not shown). A chamber housing 15 is fixed to the body 11 by means of bolts 16. A plate carrier 17 is mounted in a transverse slot 18 provided in the body 11. Gears 19 within the body cavity 20 mesh with rack teeth 21 formed on the carrier 17 to move the carrier from its operative position within the slot 18 into a chamber (not shown) within the housing 15. A gear 22 within the cavity 20 serves to open and close a sliding valve 23 which normally forms a seal between the cavity 20 and the interior of the housing 15. The carrier 17 may be moved upwardly through the housing 15 to emerge from the top thereof after the releasable sealing assembly 24 has been removed from the upper end of the housing 15.

In accordance with my invention I provide a novel form of orifice plate unit 25 which is adapted to be mounted on the carrier 17. As shown in Figure 5, the carrier 17 is provided with an axial bore 26 terminating in an inwardly extending lip 27. The orifice plate assembly 25 is axially insertable into the bore 26. The assembly 25 includes the orifice plate 28 having a central opening 29 and also includes the sealing ring unit 30 and compression ring 31. The outer cylindrical surfaces 32 and 33 of the members 30 and 31 fit slidably within the bore 26 on the plate carrier 17, and the rim 34 on the sealing ring unit 30 engages the lip 27. The flow through the passage 12 occurs in the direction of the arrow 35 (see Figure 1) and hence the rim 34 and lip 27 are located on the downstream side of the orifice plate assembly 25. The unit 30 includes a metallic ring 36 having a relatively soft sealing ring 37 mounted within an annular recess 38 and bonded to the ring 36. The sealing ring 37 may be provided with a relatively thick portion 39 and a relatively thin portion 40. A counterbore 41 is provided in the compression ring 31 to receive the orifice plate 28.

Retainer means are provided for holding the parts 28, 30 and 31 against axial disassembly. As shown in the drawings, this retainer means includes wire loop elements 42 each pivotally mounted to the metallic ring 36 and each adapted to engage over an upstanding ear or abutment 43 provided on the compression ring 31. When the retainer loops 42 are in operative position as shown in Figures 3 and 4, they are positioned wholly within the cylindrical outline defined by the surfaces 32 and 33, and therefore do not interfere with axial insertion of the assembly 25 into the plate carrier bore 26.

The outer surface of the metallic ring 36 is provided with a relatively hard rubber gasket 44 which is integrally bonded thereto. The gasket 44 is preferably formed of synthetic rubber having a hardness of about 95 Shore. The sealing ring 37 is preferably formed of the same type of material but having a hardness of about 60 Shore.

The over-all thickness of the assembly 25 when initially inserted into the bore 26 of the carrier 17 is greater than the width of the slot 18 in the body 11. Therefore, when the plate carrier 17 is lowered through the cavity 20 and into the slot 18 the metallic ring 36 and the compression ring 31 are moved axially together to distort the thick portion 39 of the seal ring 37. Since the gasket 44 has a higher Shore hardness it is distorted to a smaller extent. When in operative position the gasket 44 engages the annular sealing surface 45 on the body 11 and the compression ring 31 engages the annular surface 46 on the body 11. The pressure differential across the orifice plate is measured by means of the usual small openings 47 and 48 in the body 11.

Upon removal of the plate carrier 17 from the device 10, the retainer loops 42 may be swung to an inoperative position as viewed in Figure 6 so that the metallic unit 36 and ring 31 may be axially separated to permit removal of the orifice plate 28 for inspection, maintenance or replacement. The unit 36 and compression ring 31 act as buffers or shields to prevent damage to the orifice plate when moving it into or out of operative position by means of the plate carrier 17.

Having fully described my invention, it is to be understood that I do not wish to be limited to the details herein set forth, but my invention is of the full scope of the appended claims.

I claim:

1. In combination with an orifice meter device having a body provided with a flow passage and a transverse slot, the improvement comprising: an orifice plate assembly having an orifice plate, a sealing ring unit and a compression ring, the orifice plate being concentric with and interposed between the sealing ring unit and the compression ring, a plate carrier having an axial bore provided with a radially extending lip, the orifice plate assembly being axially insertable into said bore to contact said lip, the sealing ring unit comprising a metallic ring having a rubber sealing element bonded to one face thereof and a rubber gasket bonded to another face thereof, the rubber sealing element engaging the orifice plate, and the gasket being adapted to form a seal with the body.

2. An orifice plate assembly comprising in combination: an annular orifice plate, a sealing ring member, a compression ring member, the orifice plate being concentric with and interposed between the said members, the sealing ring member having a rubber sealing element engaging the orifice plate, means preventing relative radial movement of the orifice plate and compression ring member, retainer means preventing axial separation of the said members to maintain the orifice plate in position therebetween, said retainer means including a loop element mounted upon one of the members near the periphery thereof and an abutment on the periphery of the other member, the loop element being releasably engageable with the abutment.

3. In combination with an orifice meter device having a body provided with a flow passage and a transverse slot, the improvement comprising: a plate carrier adapted to be inserted through said transverse slot and having a transverse circular aperture larger than said flow passage whereby the peripheral wall of said aperture and the adjacent walls of said slot form an annular channel surrounding said flow passage; an orifice plate assembly adapted to fit said aperture and axially movable as a unit in said annular channel, said orifice plate assembly including an orifice plate, a compression ring counterbored to receive the periphery of said orifice plate, a sealing ring fitting over the opposite side of said orifice plate from said compression ring, and means securing said compression ring and sealing ring together and permitting limited relative axial displacement.

4. In combination with an orifice meter device having a body provided with a flow passage and a transverse slot, the improvement comprising: a plate carrier adapted to be inserted through said transverse slot and having a transverse circular aperture larger than said flow passage whereby the peripheral wall of said aperture and the adjacent walls of said slot form an annular channel surrounding said flow passage; an orifice plate assembly adapted to fit said aperture and axially movable as a unit in said annular channel, said orifice plate assembly including an orifice plate, a compression ring counterbored to receive the periphery of said orifice plate, a sealing ring fitting over the opposite side of said orifice plate from said compression ring, and means securing said compression ring and sealing ring together and permitting limited relative axial displacement, said sealing ring including a metallic ring member, a rubber-like sealing element bonded to one face thereof and a rubber-like gasket bonded to the opposite face, the sealing element being engageable with the orifice plate, and the gasket being engageable with a wall of said annular channel to form a seal with said body.

References Cited in the file of this patent

UNITED STATES PATENTS

| Number | Name | Date |
| --- | --- | --- |
| 1,903,068 | Robinson | Mar. 28, 1933 |
| 2,014,682 | Greene | Sept. 17, 1935 |
| 2,025,545 | Muff | Dec. 24, 1935 |
| 2,062,584 | Langdon | Dec. 1, 1936 |
| 2,271,282 | Young | Jan. 27, 1942 |
| 2,407,951 | Daniel | Sept. 17, 1946 |